US006234830B1

(12) United States Patent
Ensz et al.

(10) Patent No.: US 6,234,830 B1
(45) Date of Patent: May 22, 2001

(54) TRACING INTERFACE MODULE FOR PATCH CORDS IN A TELECOMMUNICATIONS SYSTEM

(75) Inventors: Lyndon D. Ensz, Omaha, NE (US); Harold B. Frick, Gwinnett County, GA (US); Michael Gregory German, Secaucus, NJ (US); Daniel Warren Macauley, Fishers, IN (US)

(73) Assignee: Avaya Technology Corp., Miami Lakes, FL (US)

( * ) Notice: Subject to any disclaimer, the term of this patent is extended or adjusted under 35 U.S.C. 154(b) by 0 days.

(21) Appl. No.: 09/247,269

(22) Filed: Feb. 10, 1999

(51) Int. Cl.[7] ........................................ H01R 3/00
(52) U.S. Cl. .......................... 439/491; 439/49; 439/490
(58) Field of Search .................... 439/491, 490, 439/76, 49; 340/654, 656, 687; 200/51.02, 51.04

(56) References Cited

U.S. PATENT DOCUMENTS 5,487,666 * 1/1996 Digiovanni ............................ 434/72
5,876,240 * 3/1999 Derstine et al. ...................... 439/490
5,915,993 * 6/1999 Belopolsky et al. ................. 439/490

* cited by examiner

*Primary Examiner*—Lincoln Donovan
*Assistant Examiner*—Brian S. Webb
(74) *Attorney, Agent, or Firm*—Gibbons, Del Deo, Dolan, Griffinger & Vecchione

(57) ABSTRACT

A tracing interface module for use in a patch cord tracing system, wherein the patch cord tracing system traces patch cords in a telecommunications patching system. The tracing interface module attaches to the face of the patch panels in a telecommunications closet. The tracing interface modules provide a means of detecting when patch cords have been removed from, or added to, the connector ports on the patch panels. The tracing interface module has three primary components. The first component is a support plate that attaches to the patch panel. The second component is a printed circuit board that is supported by the support plate. The support plate is manufactured with voids that correspond in position to surface mounted components on the printed circuit board. Consequently, the components on the printed circuit board pass into the support plate, thereby creating a highly space efficient assembly. The third major component of the tracing interface module is a graphics overlay that protects the printed circuit board and helps identify the visual manifestations of the various functions performed by the printed circuit board.

19 Claims, 4 Drawing Sheets

TRACING INTERFACE MODULE FOR PATCH CORDS IN A TELECOMMUNICATIONS SYSTEM

RELATED APPLICATIONS

This application is related to the following co-pending applications, the disclosures of which are incorporated into this specification by reference.

U.S. patent application Ser. No. 09/247,613, entitled SYSTEM AND METHOD FOR ADDRESSING AND TRACING PATCH CORDS IN A DEDICATED TELECOMMUNICATIONS SYSTEM U.S. patent application Ser. No. 09/247,614, entitled SYSTEM AND METHOD OF OPERATION FOR A TELECOMMUNICATIONS PATCH SYSTEM;

U.S. patent application Ser. No. 09/287,385, entitled DISPLAY PANEL OVERLAY STRUCTURE AND METHOD FOR TRACING INTERFACE MODULES IN A TELECOMMUNICATIONS PATCH SYSTEM;

U.S. patent application Ser. No. 09/247,270, entitled METHOD AND DEVICE FOR DETECTING THE PRESENCE OF A PATCH CORD CONNECTOR IN A TELECOMMUNICATIONS PATCH SYSTEM;

U.S. patent application Ser. No. 09/247,237, entitled METHOD AND DEVICE FOR DETECTING THE PRESENCE OF A PATCH CORD CONNECTOR IN A TELECOMMUNICATIONS PATCH SYSTEM USING PASSIVE DETECTION SENSORS;

U.S. patent application Ser. No. 09/404,420, entitled SYSTEM AND METHOD FOR IDENTIFYING SPECIFIC PATCH CORD CONNECTORS IN A TELECOMMUNICATIONS PATCH SYSTEM; and U.S. patent application Ser. No. 09/404,619, entitled SYSTEM AND METHOD OF INTERCONNECTING TRACING INTERFACE MODULES TO A CENTRAL CONTROLLER IN A TELECOMMUNICATIONS PATCH SYSTEM.

BACKGROUND OF THE INVENTION

1. Field of the Invention

The present invention relates to the structure and method of operations of dedicated telecommunications patching systems where various telecommunications lines are selectively interconnected using patch cords. More particularly, the present invention relates to telecommunication patching systems that embody patch cord tracing capabilities that help a technician locate the opposite ends of a specific patch cord within the system. The present invention also relates to systems that enable a technician to transmit and receive data with a telecommunications system from a remote location.

2. Description of the Prior Art

Many businesses have dedicated telecommunication systems that enable computers, telephones, facsimile machines and the like to communicate with each other, through a private network, and with remote locations via a telecommunications service provider. In most buildings, the dedicated telecommunications system is hard wired using telecommunication cables that contain conductive wire. In such hard wired systems, dedicated wires are coupled to individual service ports throughout the building. The wires from the dedicated service ports extend through the walls of the building to a telecommunications closet or closets. The telecommunications lines from the interface hub of a main frame computer and the telecommunication lines from external telecommunication service providers are also terminated within the telecommunications closets.

A patching system is used to interconnect the various telecommunication lines within the telecommunications closet. In a telecommunications patching system, all of the telecommunication lines are terminated within the telecommunications closet in an organized manner. The organized terminations of the various lines are provided via the structure of the telecommunications closet. Within the telecommunications closet is typically located a mounting frame. On the mounting frame is connected a plurality of racks. The telecommunications lines terminate on the racks, as is explained below.

Referring to FIG. 1, a typical prior art rack 10 is shown. The rack 10 retains a plurality of patch panels 12 that are mounted to the rack 10. On each of the patch panels 12 are located port assemblies 14. The port assemblies 14 each contain six RJ-45 telecommunication connector ports 16.

Each of the different telecommunication connector ports 16 is hard wired to one of the system's telecommunications lines. Accordingly, each telecommunications line is terminated on a patch panel 12 in an organized manner. In small patch systems, all telecommunications lines may terminate on the patch panels of the same rack. In larger patch systems, multiple racks are used, wherein different telecommunications lines terminate on different racks.

In the shown embodiment of FIG. 1, the interconnections between the various telecommunications lines are made using patch cords 20. Both ends of each patch cord 20 are terminated with connectors 22, such as an RJ-45 telecommunication connector or a RJ-11 telecommunications connector. One end of the patch cord 20 is connected to the connector port 16 of a first telecommunications line and the opposite end of the cord is connected to the connector port 16 of a second telecommunications line. By selectively connecting the various telecommunication lines with the patch cords 20, any combination of telecommunications lines can be interconnected.

In many businesses, employees are assigned their own computer network access number exchange so that the employee can interface with the companies main frame computer or computer network. When an employee changes office locations, it is not desirable to provide that employee with newly adressed telecommunications ports. Rather, to preserve consistency in communications, it is preferred that the exchanges of the telecommunication connection ports in the employee's old office be transferred to the telecommunications ports in the employee's new office. To accomplish this task, the patch cords in the telecommunication closet are rearranged so that the employee's old exchanges are now received in his/her new office.

As employees, move, change positions, add lines and subtract lines, the patch cords in a typical telecommunications closet are rearranged quite often. The interconnections of the various patch cords in a telecommunications closet are often logged in either paper or computer based log. However, technicians often neglect to update the log each and every time a change is made. Inevitably, the log is less than 100% accurate and a technician has no way of reading where each of the patch cords begins and ends. Accordingly, each time a technician needs to change a patch cord, that technician manually traces that patch cord between different connector ports. To preform a manual trace, the technician locates one end of a patch cord. The technician then manually follows the patch cord until he/she finds the opposite end of that patch cord. Once the two ends of the patch cord are located, the patch cord can be positively identified.

It takes a significant amount of time for a technician to manually trace a particular patch cord. Furthermore, manual tracing is not completely accurate and technicians often accidently go from one patch cord to another during a manual trace. Such errors result in misconnected telecommunication lines which must be later identified and corrected.

The key to a tracing system is the ability to identify the different connection ports in the telecommunication closet that are joined by opposite ends of the same patch cord. Accordingly, in order to create an effective tracing system, some sort of indicator must be positioned near each of the connection ports that are present in the telecommunications closet. There are many thousands of telecommunication patch systems in place throughout the world. Replacing these existing patch systems with new systems is not cost effective or practical. Accordingly, trace indicators must be retroactively attachable to existing patch panels in the small amount of area that is available on patch panels. Yet the indicators that are provided must not obstruct or limit access to the connector ports of which they identify.

A need therefore exists for a module that can be used in a patch cord tracing system that can be retroactively connected to existing patch panels so that the modules provide tracing indicators to the various connector ports on the patching panels. A need also exists for such a module that fits within the space limitations of existing patching panels yet does not obstruct access to the connector ports on those patch panels.

SUMMARY OF THE INVENTION

The present invention is a tracing interface module for use in a patch cord tracing system, wherein the patch cord tracing system traces patch cords in a telecommunications patching system. The tracing interface module attaches to the face of the patch panels in a telecommunications closet. The tracing interface modules provide a means of detecting when patch cords have been removed from, or added to, the connector ports on the patch panels. The tracing interface modules also have the ability to provide a technician with some type of indication as to the location of a specific patch cord during a patch cord tracing procedure.

The tracing interface module has three primary components. The first component is a support plate that attaches to the patch panel. The second component is a printed circuit board that is supported by the support plate. The support plate is manufactured with voids that correspond in position to surface mounted components on the printed circuit board. Consequently, the components on the printed circuit board pass into the support plate, thereby creating a highly space efficient assembly.

The third major component of the tracing interface module is a graphics overlay that protects the printed circuit board and helps identify the visual manifestations of the various functions performed by the printed circuit board.

BRIEF DESCRIPTION OF THE DRAWINGS

For a better understanding of the present invention, reference is made to the following description of and exemplary embodiment thereof, considered in conjunction with the accompanying drawings, in which.

DETAILED DESCRIPTION OF THE DRAWINGS

Figure 1:
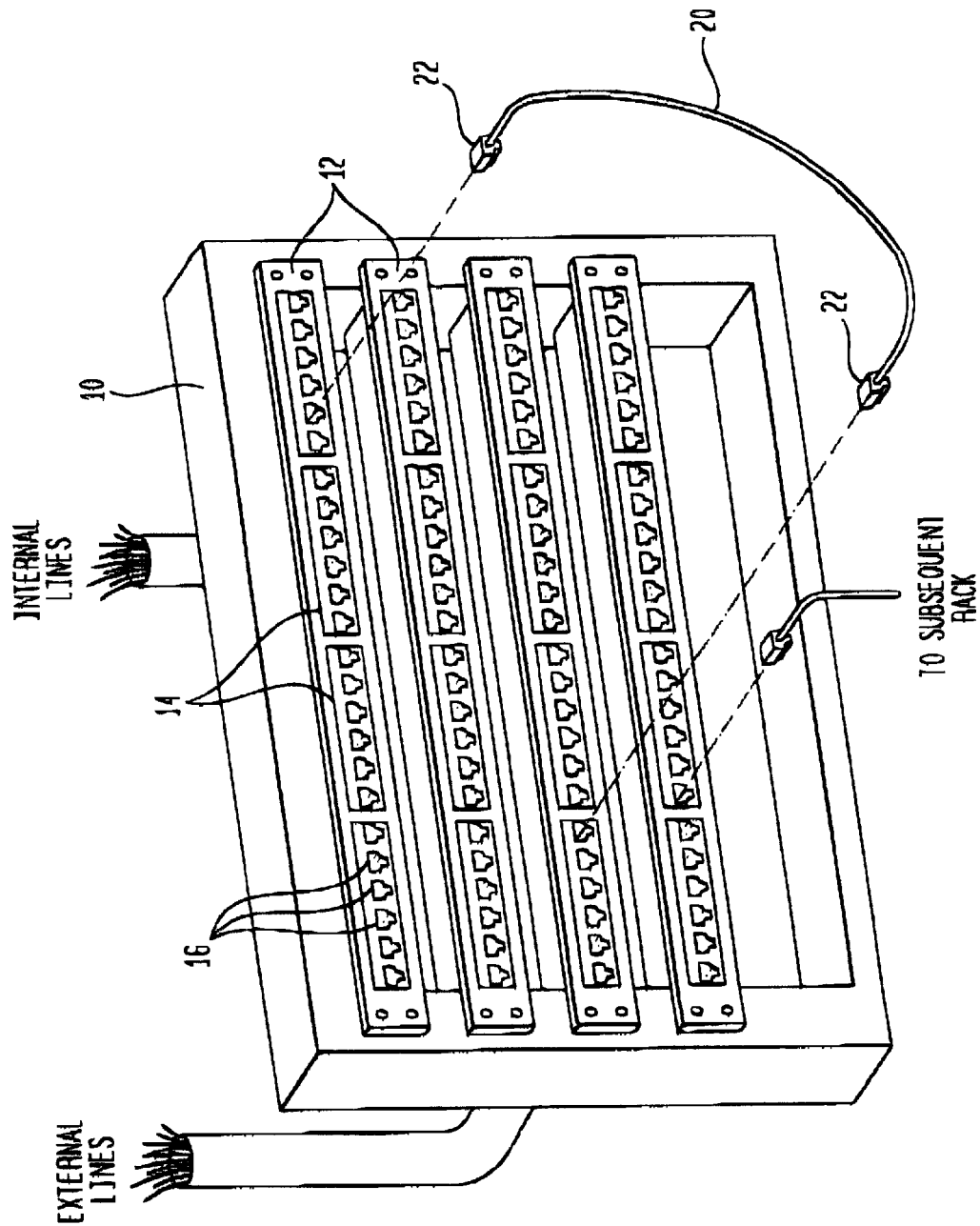
FIG. 1 is a perspective view of a typical prior art telecommunications rack assembly containing multiple patch panels with connector ports that are selectively interconnected by patch cords.
Figure 2:
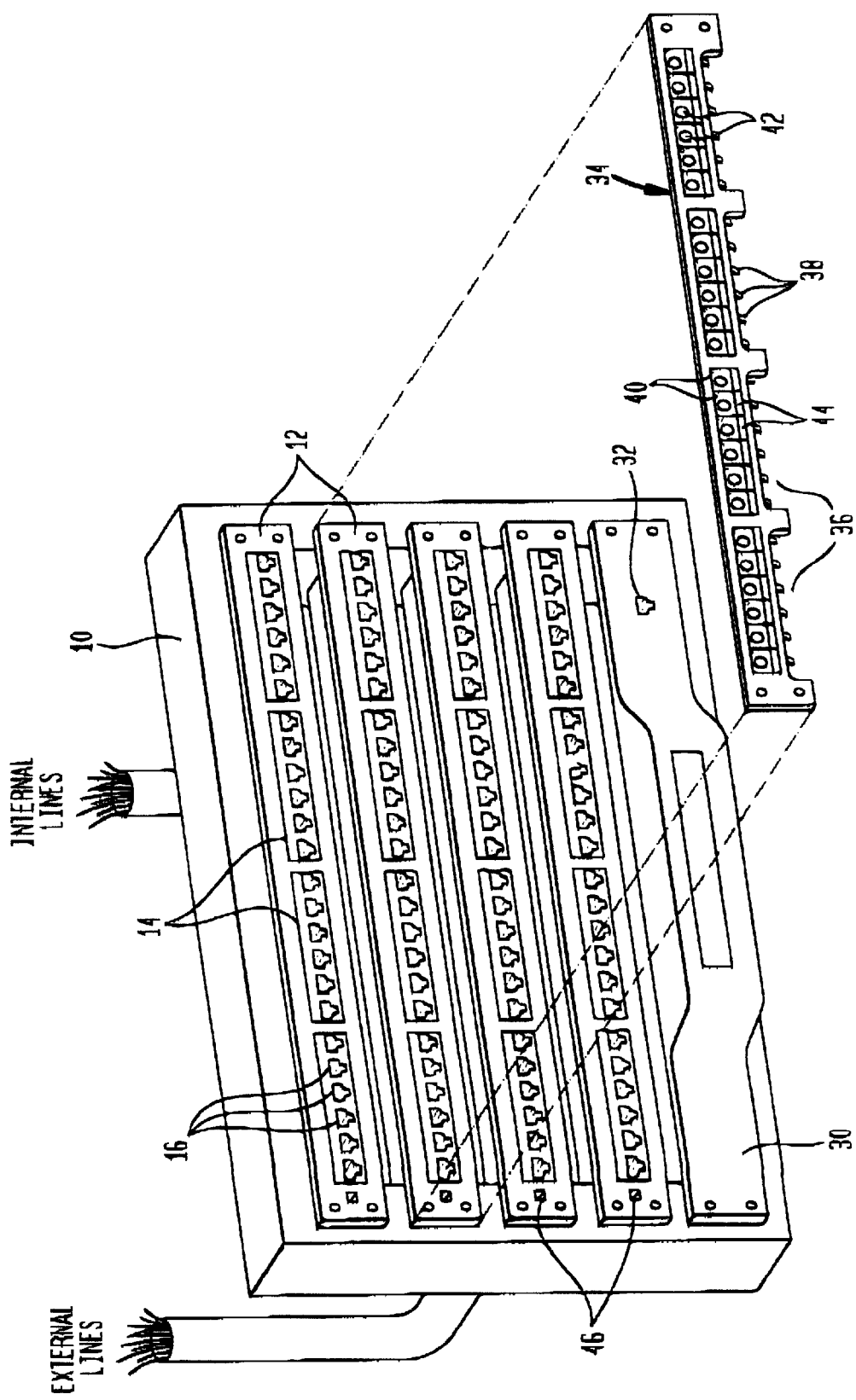
FIG. 2 is a perspective view of a tracing interface module and rack controller in accordance with the present invention, shown in conjunction with the prior art telecommunications rack assembly of FIG. 1.

Referring to FIG. 2, a conventional telecommunications rack 10 is shown, such as the one previously describe in regard to FIG. 1. The telecommunications rack 10 contains a plurality of patch panels 12 that are mounted in parallel horizontal rows within the rack 10. Each of the patch panels 12 contains a plurality of patch port assemblies 14. The connector ports 16 associated with each of the patch port assemblies 14 are hard wired to the various telecommunications lines that enter the telecommunications closet.

A rack controller 30 is mounted to each rack 10 in the overall patch system. The rack controller 30 contains a central processing unit (CPU). The CPU is capable of independently running line tracing programs and also contains a remote access port 32 that enables the CPU to be accessed by a remote computer. Remote access of the rack controller is the subject of related co-pending patent application Ser. No. 09/247,614, entitled System And Method Of Operation For A Telecommunications Patch System, which has already been incorporated into this application by reference.

The purpose of the rack controller 30 is to operate and gather data from the various tracing interface modules 34. The tracing interface modules 34 are modules that mount to the face of each patch panel 12 on the rack 10. The tracing interface modules 34 surround the various connector ports 16 located on a patch panel 12 and provide an interface through which data about each connector port 16 can be transmitted to and from the rack controller 30.

In the shown embodiment, the tracing interface module 34 contains a rectangular relief 36 that surrounds the connector ports 16 on each patch port assembly 14 when the tracing interface module 34 is connected to the patch panels 12. From FIG. 2, it can be seen that a plurality of sensors 38 extend into the area of the rectangular relief 36 from the tracing interface module. Each sensor corresponds in position with one of the connector ports 16 on the patch panel 12. As the terminated end of a patch cord 20 (FIG. 1) is connected to a connector port 16, the presence of the patch cord is detected by the CPU within the rack controller 30. The CPU in the rack controller 30 is therefore capable of automatically determining when a patch cord has been added or removed from any connector port on the rack.

In addition to the sensors 38, the tracing interface module also contains light emitting diodes (LEDs) 40 and tracing buttons 42. An LED 40 and tracing button 42 are provided for each connector port 16 when the tracing interface module 34 is connected to a patch panel 12. Accordingly, once the tracing interface module 34 is in place, each connector port 16 on the patch panel 12 has an LED 40 and tracing button 42 that corresponds in position to that connector port 16.

Indicia may be printed on each of the tracing buttons 42 to help identify the different tracing buttons. Additionally, a labeling area 44 is provided below each tracing button 42 for further identification. Each labeling area 44 can be written upon to identify the associated connector port in a manner useful to the systems technician.

Figure 3:
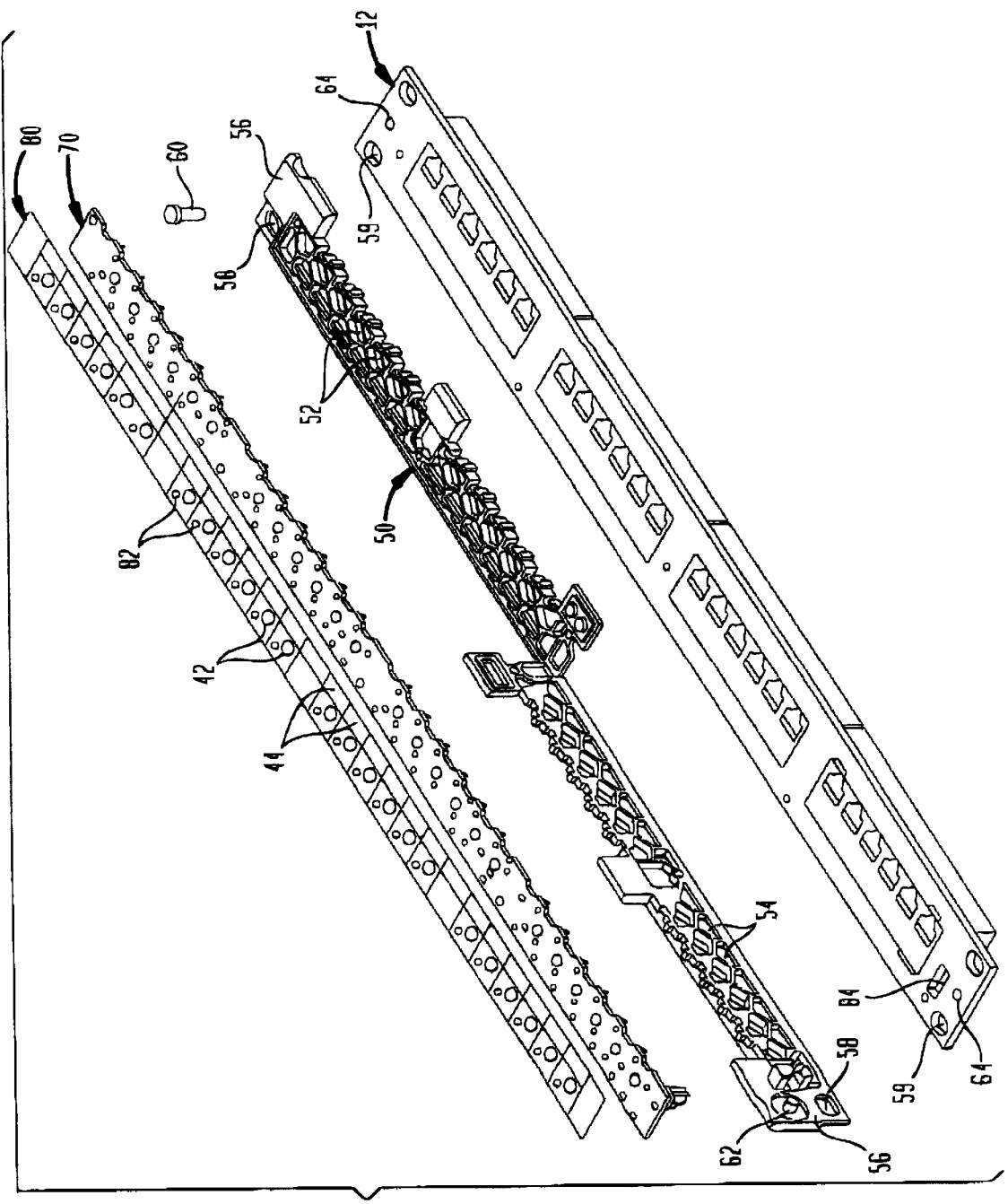
FIG. 3 is an exploded perspective view of one exemplary embodiment of an tracing interface module in accordance with the present invention.

Referring to FIG. 3, it can be seen that each tracing interface module 34 is an assembly comprised of three main sub-assemblies. First, there is the support frame 50. The support frame 50 is a molded structure having an intricate lattice of interconnecting structural elements 52. The lattice of interconnecting structural elements 52 defines a plurality of specifically shaped and positioned voids 54. The purpose and configuration of the voids 54 will later be explained.

The support frame 50 can be molded as a single unistructural piece. However, to reduce tooling costs, the support frame 50 can be molded in a plurality of pieces that join together to create the overall support frame. In the embodiment of FIG. 3, the support frame 50 is made of two separate pieces. The two pieces snap together to create the overall structure.

The opposite ends of the support frame 50 terminate with mounting plates 56. Apertures 58 are disposed through the mounting plates 56 that align with the mounting screw holes 59 in the patch panel 12. Accordingly, the mounting fasteners 60 that mount the patch panel 12 to the rack 10 (FIG. 2) can be used to mount the support plate 50 to the patch panel 12. Alignment pins 62 also extend downwardly from the mounting plate 56 at the ends of the support plate 50. The alignment pins 62 engage holes 64 disposed in the ends of the patch panel 12. The positioning of the alignment pins 62 of the support plate 50 in the holes 64 of the patch panel 12 ensures that the support plate 50 is properly positioned over the patch panel 12 before the mounting fasteners 60 are used to lock the support plate 50 in place.

The second major component of the tracing interface module 34 is a printed circuit board 70. The printed circuit board 70 contains the electronics needed for the operation of the tracing interface module 34. There is more than one type of tracing interface module. Accordingly, the electronics embodied by the printed circuit board 70 vary depending upon the type of tracing interface module being used. For example, in the embodiment of FIG. 2, the tracing interface module 34 contained LEDs, sensors and trace buttons. Each of these components would be present in the design layout of the printed circuit board 70. In alternate embodiments, the tracing interface module may contain a liquid crystal display or a touch screen. Such an embodiment is shown in co-pending patent application Ser. No. 09/247,385, entitled, Display Panel Overlay Structure And Method For Tracing Interface Modules In A Telecommunications Patch System, which has been incorporated into this disclosure by reference. Furthermore, the sensors 38 (FIG. 2) that detect the presence of patch cords can be mechanical switches, passive detection sensors or intelligent detection sensors. Such variations in sensor design are disclosed in co-pending patent application Ser. No. 09/247,270, entitled, Method And Device For Detecting The Presence Of A Patch Cord Connector In A Telecommunications Patch System; and co-pending patent application Ser. No. 09/404,420, entitled System and Method For Identifying Specific Patch Cord Connectors In A Telecommunications Patch System. Both of these applications have been incorporated into this disclosure by reference.

Regardless of the electronics present on the printed circuit board 70, the printed circuit board 70 is thin and is easily broken. Furthermore, the printed circuit board 70 contains electronic components, such as resistors, microchips and the like, that protrude from its bottom surface.

The purpose of the support plate 50 is to support the printed circuit board 70 in a space efficient manner. Accordingly when the circuit board 70 is pressed against the support plate 50, that support plate prevents the printed circuit board 70 from deforming and becoming damaged.

Figure 4:
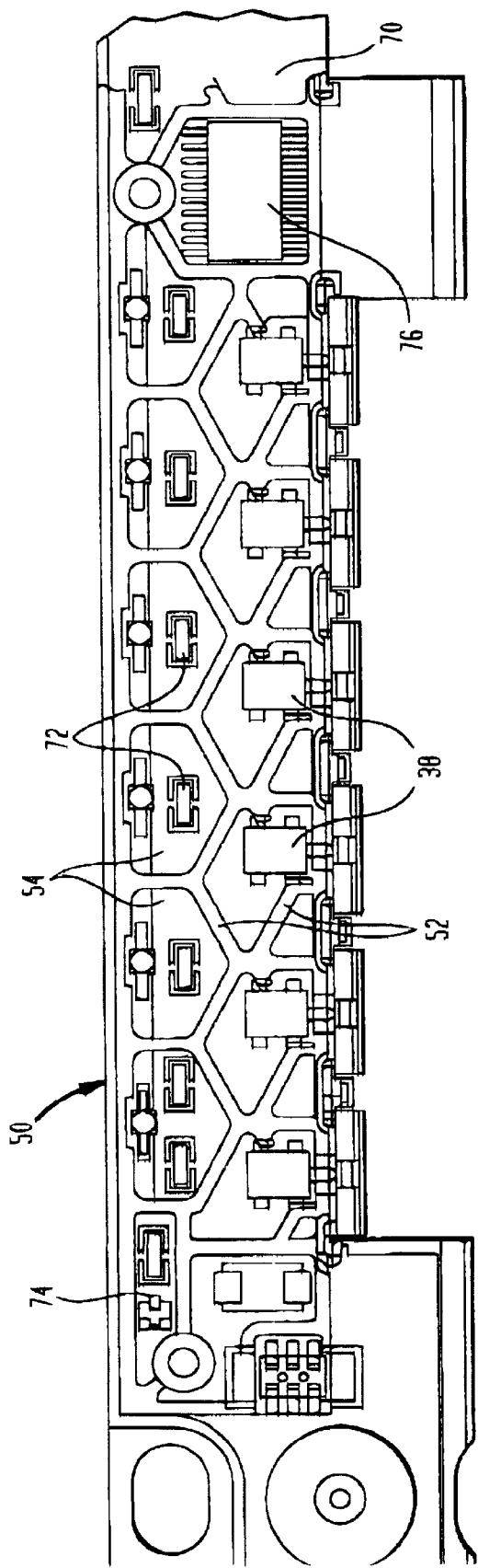
FIG. 4 is an enlarged, fragmented view of a section a printed circuit board sitting in a section of a support plate, as part of the tracing interface module.

Referring to FIG. 4, it can be seen that the printed circuit board 70 contains numerous resistors 72, surface mounted components 74, and microchips 76. Furthermore, the printed circuit board 70 also contains mechanical sensor switches 38 (such as is shown), passive sensor switches or intelligent sensor devices.

The circuit layout of the printed circuit board 70 and the lattice of structure elements 52 on the support plate 50 are designed in unison. Accordingly, the voids 54 in the support plate 50 defined by the structural elements 52 of the support plate 50 are positioned to correspond to each electronic element that extends from the printed circuit board 70. Accordingly, each resistor 72, microchip 76, sensor 38 and other surface mounted component 74 passes into a void 54 in the support plate 50 when the printed circuit board 70 rests upon the support plate 50.

Since the various surface mounted components on the printed circuit board 70 pass into the voids 54 of the support plate 50, the printed circuit board 70 attaches to the support plate 50 in a highly space efficient manner. Accordingly, the overall tracing interface module 34 can be produced with a very thin profile.

Returning to FIG. 3, it can be seen that the third major component of the tracing interface module 34 is the graphic overlay 80. The graphics overlay 80 protects the top surface of the printed circuit board 70. The graphics overlay 80 can have numerous configurations. In the embodiment of FIG. 2, the graphics overlay 80 provides a trace button 42, an LED aperture 82 and a labeling area 44 for each connector port 16 on the patch panels 12. In alternate embodiments, the graphics overlay 80 may contain a liquid crystal display and/or a touch screen. These embodiments are described in co-pending patent application Ser. No. 09/247,385, entitled, Display Panel Overlay Structure And Method For Tracing Interface Modules In A Telecommunications Patch System which has previously been incorporated by reference.

The graphics overlay 80 also enables data to be transmitted to the telecommunications closet from a remote location. This enables technicians to receive and execute paperless work orders. Transmitting data to and from a telecommunications closet from a remote location is described in co-pending patent application Ser. No. 09/247,614, entitled, System And Method Of Operation For A Telecommunications Patch System.

Since the present invention tracing interface module is capable of attaching to any patch panel without obstructing the patch panel, it should be clear that the present invention tracing interface module can be retroactively added to many different types of telecommunication patch systems. The tracing interface modules are designed with very thin profiles. Accordingly, when added to existing patch systems, the components of the present invention do not require any physical changes to the layout of the telecommunications closet or the position of the patch panels on the racks within that closet.

It will be understood that the embodiment of the present invention specifically shown and described is merely exemplary and that a person skilled in the art can make alternate embodiments using different configurations and functionally equivalent components. For example, there can be many different graphic layouts for the tracing interface module configurations that can be used in accordance with the present invention, other than the exemplary layout shown. All such alternate embodiments are intended to be included in the scope of this invention as set forth in the following claims.

What is claimed is:

1. A patch cord tracing module assembly, comprising:
   a circuit board having a bottom surface and a top surface, said circuit board containing a plurality of connector sensors operable to detect a proximately connected patch cord;
   a support frame for supporting said circuit board, said support frame defining a plurality of voids, wherein said voids are positioned to receive said connector sensors when said circuit board is placed against said support frame; and
   a graphics overlay affixed to said top surface of said circuit board, wherein said graphics overlay contains a visual display that identifies each of said connector sensors on said circuit board and a human interface device associated with at least one of said connector sensors.

2. The assembly according to claim 1, wherein said circuit board has numerous surface mounted elements extending from said bottom surface thereof, and said support frame defines voids that correspond in position with said surface mounted elements, thereby enabling said circuit board to lay flat against said support frame.

3. The assembly according to claim 1, wherein a plurality of LEDs extend from said top surface of said circuit board, each LED being positioned to correspond with the position of one of said connector sensors.

4. The assembly according to claim 3, wherein said graphics overlay contains apertures through which said LEDs on said circuit board can be viewed.

5. The assembly according to claim 1, wherein said human interface device is implemented as a push button disposed on said top surface of said circuit board, ones of said push buttons being positioned to correspond in position with ones of said connector sensors.

6. The assembly according to claim 5, wherein said graphics overlay provides an identifying indicia to each of said push buttons.

7. The assembly according to claim 1, wherein said visual display on said graphic overlay is a labeling area wherein the identity of a connector sensor can be written.

8. The assembly according to claim 1, wherein said connector sensors are mechanical switches.

9. The assembly according to claim 1, wherein said support frame is comprised of a plurality of separate pieces that interconnect to form a single support frame capable of supporting said circuit board.

10. The assembly according to claim 1, wherein said support frame has a first end and a second end, wherein mounted apertures are defined by said support frame proximate said first end and said second end.

11. The assembly according to claim 10, wherein alignment pins extend from said support frame at points proximate said first end and said second end.

12. A telecommunications system having point-to-point tracing capabilities, comprising:
   at least one rack structure:
   a plurality of patch panels mounted to each said rack structure;
   a plurality of connector ports disposed on each of said patch panels;
   a plurality of patch cords for selectively interconnecting different pairs of connector ports;
   tracing modules mounted to said patch panels above said connector ports, wherein said tracing modules contain patch cord sensors for sensing the presence of a patch cord in each connector ports, a visible indicator for identifying a position of a selected connected port from among said plurality of connector ports and a human interface device associated with at least one of said patch cord sensors.

13. The system according to claim 12, further including a controller on each said rack structure that is coupled to each of said tracing modules on that rack structure.

14. The system according to claim 12, wherein said tracing module contains:
   a circuit board having a bottom surface and a top surface, said circuit board containing a plurality of patch cord sensors operable to detect a proximately connected patch cord;
   a support frame for supporting said circuit-board, said support frame defining a plurality of voids, wherein said voids are positioned to receive said patch cord sensors when said circuit board is placed against said support frame; and
   a graphics overlay affixed to said top surface of said circuit board, wherein said graphics overlay contains a visual display that identifies each of said patch cord sensors on said circuit board.

15. The system according to claim 14, wherein said circuit board has numerous surface mounted elements extending from said bottom surface thereof, and said support frame defines voids that correspond in position with said surface mounted elements, thereby enabling said circuit board to lay flat against said support frame.

16. The system according to claim 14, wherein a plurality of LEDs extend from said top surface of said circuit board, each LED being positioned to correspond with the position of one of said patch cord sensors.

17. The system according to claim 14, wherein said human interface device is implemented as a push button disposed on said top surface of said circuit board, ones of said push buttons being positioned to correspond in position with ones of said patch cord sensors.

18. The system according to claim 17, wherein said graphic overlay provides an identifying indicia to each of said push buttons.

19. The system according to claim 14, wherein said patch cord sensors are mechanical switches.

* * * * *